Nov. 10, 1936.    V. MILLER ET AL    2,060,682
WELDING ELECTRODE
Filed Oct. 19, 1935
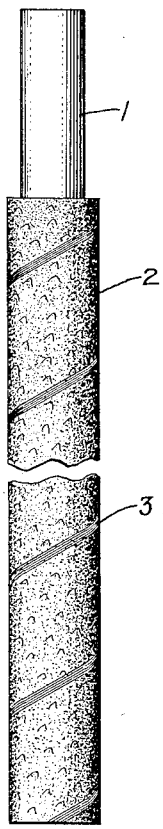
Inventors:
Virdis Miller,
Joseph H. Humberstone,
by Harry E. Dunham
Their Attorney.

Patented Nov. 10, 1936

2,060,682

UNITED STATES PATENT OFFICE 2,060,682

WELDING ELECTRODE

Virdis Miller and Joseph H. Humberstone, Schenectady, N. Y., assignors to General Electric Company, a corporation of New York Application October 19, 1935, Serial No. 45,743

5 Claims. (Cl. 219—8)

Our invention relates to electrodes used in metallic arc welding.

In metallic arc welding an arc is maintained between the work to be welded and a rod, wire, or strip of metal usually referred to as an electrode. During welding, the electrode is fused or vaporized, or both, and the metal thereof deposited upon and welded to the work as the electrode is fed toward the work to maintain the arc.

The quality of the weld metal deposited by such a process depends to a large extent upon the influence of certain elements or compounds associated with the electrode, usually in the form of a coating. Electrodes so coated are commonly referred to as flux coated electrodes.

The flux coating, besides having a definite effect on the arcing characteristics of the electrode, also protects the deposited weld metal from the influence of the surrounding atmosphere. The coating may also serve as a carrier for certain alloying elements which during the welding operation are incorporated in the weld forming a deposit of desired characteristics.

It is an object of our invention to provide an improved flux coated electrode suitable for building up rail ends and for many other semi-hard surfacing applications.

It is a further object of our invention to provide a coating which when applied to a mild steel electrode produces a deposit containing manganese and carbon in suitable proportions to form a deposit having high resistance to impact and abrasion and which, when applied to restore battered rail ends to their original condition, responds to the cold working of wheel batter as well as the rail itself.

It is a further object of our invention to provide an electrode which during welding produces a very wide, flat, and smooth bead of weld metal.

Further objects of our invention will appear from the following description taken in connection with the accompanying drawing which illustrates one embodiment thereof.

The flux coating of the present invention is characterized primarily by the use of silicon carbide and ferro-manganese in conjunction with constituents suitable for forming a glassy slag that will not react with the weld metal. The ratio of the silicon carbide to the ferro-manganese may be varied, but, when the coating is applied to a mild steel rod, a deposit of desired hardness for rail welding is obtained when these two materials are used in substantially the same percentage by weight. The combined weight of the silicon carbide and ferro-manganese in the flux may vary from 15 to 50 per cent, these two ingredients being present in the flux in substantially equal parts by weight. An electrode having a manganese content of from .40% to .60% and a carbon content of from .13% to .18% in the presence of a coating containing silicon carbide and ferro-manganese in substantially equal percentages, each of which forms about 15% of the total weight of the flux employed, will deposit weld metal having a manganese content of 1.25% and a carbon content of .25%.

The presence of silicon carbide in the flux causes the arc to operate at a voltage between 40 and 50 volts which is much higher than the normal operating voltage of heavy coated electrodes. In the arc the silicon carbide apparently disassociates into its constituent elements silicon and carbon. Sufficient silicon carbide is used so that enough silicon is present to serve as a deoxidizer and also permit a certain amount of silicon to be added to the weld metal. The presence of the silicon in the weld metal increases its fluidity. That part of the silicon that acts as a deoxidizer permits the carbon provided by the silicon carbide and the manganese of the ferro-manganese to enter in the weld deposit in substantial quantities without combining with the oxygen of the surrounding atmosphere in which the welding operation is being performed. The increased operating voltage of the electrode and the alloying action occurring in the weld deposit is believed to be responsibe for the wide, flat and smooth bead produced which is admirably suited for surfacing operation.

The constituents of the flux other than the ferro-manganese and silicon carbide may vary considerably without departing from the spirit and scope of our invention. Apparently all that is necessary is that these additional constituents form during welding a glassy slag which will cover the weld deposit without reacting with it and protect it from the surrounding atmosphere. The flux when applied as a heavy coating also forms at the arcing terminal of the electrode a projecting sleeve which surrounds the end of the electrode and protects it from the action of the atmosphere. The constituents of the flux also vaporize during welding and produce a shield of gas about the arc and the metal deposited from the electrode into the weld. This shielding effect may be greatly increased by providing the electrode with a cellulosic covering which is impregnated with the flux. The reducing atmosphere produced by the burning of the cellulosic material apparently assists in the dissociation of the silicon carbide and increases its effectiveness during welding.

The electrode illustrated in the drawing comprises a core of mild steel *I* having a heavy flux coating *2* of substantially the following composition:

|  | Per cent by weight |
|---|---|
| Ferro-manganese | 14 |
| Silicon carbide | 15 |
| Ilmenite | 34 |
| Feldspar | 5 |
| Talc | 4 |
| Liquid sodium silicate | 25 |
| Water | 3 |

This flux is applied to the core of the electrode in conjunction with a coating of fibrous cellulosic material which is impregnated therewith. This material may be a cotton tape which is folded longitudinally about the core of the electrode with its edges abutting one another and parallel to the axis thereof, as described and claimed in United States Letters Patent 2,016,899, granted October 8, 1935 on the application of one of us, Serial No. 648,651, Joseph H. Humberstone, filed December 23, 1932 for Welding electrodes, and assigned to the same assignee as the present application. The tape is usually applied to the core of the electrode so as to obtain a substantial layer of flux between it and the core of the electrode.

In the process of manufacturing such an electrode, it has been found desirable to hold the tape about the core of the electrode by means of a helical binding *3*. This binding is made of a flat strip, the turns of which are placed a substantial distance from one another, as illustrated in the drawing. This binding, when colored, may indicate the flux composition employed on the electrode.

A core of substantially the following composition:

| Carbon | .13 to .18 per cent |
|---|---|
| Manganese | .40 to .60 per cent |
| Phosphorus | .04 per cent maximum |
| Sulphur | .04 per cent maximum |
| Silicon | .025 per cent maximum |
| Iron | Remainder | when provided with a coating of the particular composition above described will produce a weld deposit having a manganese content of 1.35% and a carbon content of .25%. The tensile strength of this deposit is from 100,000 to 105,000 pounds per square inch as deposited. It has an impact value of about 20 foot pounds. The hardness of the deposit will average about 305 Brinell when deposited on a rail of 268 Brinell. This is a most desirable ratio for if the deposit were of 500 to 560 Brinell, there would be a tendency for it to crack and spall under the cold working caused by the wheels of the rolling stock moving over the rails. On the other hand, if it were softer than the rail, it would batter down quickly and be of little use.

As has been noted above, the weld metal is deposited as a very wide, flat, and smooth bead requiring but a small amount of grinding to adapt it as a finished surface for reconditioned rail ends. In the majority of cases, one layer of deposit metal is sufficient to build up the average battered rail end, the deposited metal being so smooth as to present no difficulty from traffic passing over the deposit before grinding. The technique of applying the deposit may vary widely. One recommended method is that illustrated, described, and claimed in Letters Patent No. 1,976,526, Bernard C. Tracey, October 9, 1934, assigned to the same assignee as the present invention. Best results are obtained by holding a long arc and overlapping each previous bead by one-half. Because the weld metal deposits can with an electrode of this invention be made as thin as desired, the time and expense required for grinding the deposit to produce a finished surface is reduced to a minimum.

The electrode is suitable for surfacing many wearing parts because it produces hard, wear resisting, and work hardening deposits. The arc shielding action of its heavy flux coating maintains a stable flexible arc and permits a high welding rate together with close regulation of the height of the deposit.

When using an electrode of the above described character, the operation is best performed with reverse polarity; that is with the electrode connected to the positive terminal of the source of supply, although straight polarity has been used successfully. The electrode may also be used successfully with alternating current sources of supply.

The electrode illustrated in the drawing is a short length rod such as would usually be employed in hand welding operation. The upper end of the electrode has been bared of flux in order to adapt it for use in an electrode holder by means of which welding current is supplied thereto. Electrodes may be made in accordance with our invention in long lengths for use in semi-automatic machines by means of which the electrode is fed toward and away from the work to strike and thereafter maintain a welding arc by means of a mechanism which functions in response to a characteristic of the welding arc such as its current or voltage. In such automatic machines the welding current may be supplied to the electrode through incisions made in the flux coating or other openings provided by removing a portion of the coating from the electrode.

Aside from the ferro-manganese and silicon carbide constituents of the flux, the flux composition may vary widely. We prefer to use, however, as flux constituents suitable for forming a glassy slag, oxides of iron and titanium in combination with silicates of aluminum, magnesium, and the alkaline metals. An aluminum flake clay of approximately the following composition:

|  | Per cent |
|---|---|
| Aluminum oxide | 38 to 42 |
| Silica | 45 to 47 |
| Ignition loss | 13 to 14 | has been successfully substituted for the feldspar and talc of the above specifically described flux composition. A flux of the following composition may be used:

|  | Per cent |
|---|---|
| Ferro-manganese | 18 |
| Silicon carbide | 18 |
| Ilmenite | 30 |
| Aluminum flake clay | 7 |
| Liquid sodium silicate | 23 |
| Water | 4 |

In making fluxes in accordance with our invention, the solid materials may be reduced to a fine powder which is mixed with a liquid sodium silicate. This material preferably has a specific gravity of 40° Baumé, an $Na_2O$ content of about 7

8%, and a ratio of Na₂O to SiO₂ of approximately 1 to 3.25. A silicate of this composition loses about 10% of its moisture on drying. Water is added to the flux in order to control its consistency and adapt it for use as a smooth paste which is applied to the electrode. By the addition of more water a thinner paste may be produced which is useful in applying thin coatings. The compositions above specifically described are adapted for use as heavy coatings which are of sufficient thickness to produce during welding a depending sleeve about the arcing terminal of the electrode and a slag deposit of sufficient volume to cover the weld metal.

It is of course apparent that a flux in accordance with our invention will produce beneficial results whether it is applied to the electrode as a coating or associated therewith in any other suitable manner. For example, the flux may be enclosed within a channel within the electrode or placed in grooves or depressions in the surface of the electrode without departing from our invention.

What we claim as new and desire to secure by Letters Patent of the United States is:

1. A welding electrode having a flux coating containing in addition to slag forming ingredients, ferro-manganese and silicon carbide in substantially equal parts by weight and forming together from 15 to 50 per cent by weight of the flux coating.

2. A welding electrode having a core of mild steel and a flux coating containing constituents forming a glassy slag during welding, ferro-manganese, and silicon carbide, the ferro-manganese and silicon carbide being present in substantially equal parts by weight and forming together from 15 to 50 per cent by weight of the flux coating.

3. A welding electrode having a core of mild steel and a coating resulting from impregnating a cellulosic material with a flux of which 85 to 50 per cent by weight consists of constituents forming a glassy slag during welding, and 15 to 50 per cent by weight consists of ferro-manganese and silicon carbide which are present in the flux in substantially equal parts by weight.

4. A coating for arc welding electrodes having substantially the following initial composition:

| | Per cent by weight |
|---|---|
| Ferro-manganese | 14 |
| Silicon carbide | 15 |
| Ilmenite | 34 |
| Feldspar | 5 |
| Talc | 4 |
| Liquid sodium silicate | 25 |
| Water | 3 |

5. An electrode having a core of substantially the following composition:

| | |
|---|---|
| Carbon | .13 to .18 per cent |
| Manganese | .40 to .60 per cent |
| Phosphorus | .04 per cent maximum |
| Sulphur | .04 per cent maximum |
| Silicon | .025 per cent maximum |
| Iron | Remainder | and a coating resulting from impregnating a cellulosic material with a flux of substantially the following composition:

| | Per cent by weight |
|---|---|
| Ferro-manganese | 14 |
| Silicon carbide | 15 |
| Ilmenite | 34 |
| Feldspar | 5 |
| Talc | 4 |
| Liquid sodium silicate | 25 |
| Water | 3 |

VIRDIS MILLER.
JOSEPH H. HUMBERSTONE.